United States Patent [19]
Frey

[11] Patent Number: 6,089,003
[45] Date of Patent: Jul. 18, 2000

[54] BALE PUSH-OFF DEVICE

[75] Inventor: Oscar Frey, Listowel, Canada

[73] Assignee: DWA Technologies Limited, Aberdeenshire, United Kingdom

[21] Appl. No.: 09/156,894

[22] Filed: Sep. 18, 1998

[51] Int. Cl.$^7$ .................................................. B65B 13/00
[52] U.S. Cl. ............................ 53/591; 53/567; 53/576; 414/24.5; 414/789.7
[58] Field of Search ................... 414/24.5, 111, 414/789.7; 53/567, 576, 591, 588, 469, 475

[56] References Cited

U.S. PATENT DOCUMENTS

| | | | |
|---|---|---|---|
| 4,606,176 | 8/1986 | Cundall | 53/567 |
| 4,793,124 | 12/1988 | Anderson | 53/588 |
| 5,012,631 | 5/1991 | Hostetler et al. | 53/588 |
| 5,692,363 | 12/1997 | Inman et al. | 53/576 |
| 5,829,233 | 11/1998 | Stirling | 53/567 |

*Primary Examiner*—Ed Tolan
*Attorney, Agent, or Firm*—Pearne, Gordon, McCoy & Granger LLP

[57] ABSTRACT

A bale push-off device is provided for pushing bales off from a bale wrapping machine for wrapping bales end to end in a row. The bale push-off device comprises a bale push-off member which in use faces a bale discharging side of a bale wrapping device of the bale wrapping machine. The bale wrapping machine comprises a bale mover having a pair of hydraulic rams and a ram cross member for moving bales towards the bale wrapping device. The bale push-off member is connected to the rams by links so as to be driven by the rams.

20 Claims, 7 Drawing Sheets

BALE PUSH-OFF DEVICE

This invention relates to a bale push-off device, and more particularly, to a bale push-off device for pushing bales off from a bale wrapping machine.

BACKGROUND OF THE INVENTION

To produce silage from grass, cut grass is often gathered to form bales and wrapped by plastic strip to ferment the grass.

U.S. Pat. No. 4,793,124 issued on Dec. 27, 1988 to Anderson discloses a bale wrapping machine which wraps bales end to end in a row while allowing the machine to move along a ground surface. Bales are received by a bale receiving support, and moved into a bale wrapping device by a ram cross bar driven by two hydraulic rams moving along the sides of the bale receiving support. The wrapped bales are moved down to a ground surface along an inclined support as they are pushed by the following bales. When a row of bales is wrapped, some wrapped bales remain in the wrapping device and on the inclined support due to lack of the following bales to push them down.

In order to empty the wrapping machine of bales, it has been proposed to move unwrapped bales through the machine until the machine becomes free of the wrapped bales, and then remove the unwrapped bales by stabbing. However, this method is labor intensive and inefficient.

Another proposed method is to use the double-acting property of the hydraulic rams. Both ends of a length of webbing are attached to the ram cross bar via the last wrapped bale through pulleys provided at the end of the inclined support so as to push the last wrapped bale down by the webbing when the ram cross bar is returned to the original position by the hydraulic rams. It is difficult and dangerous to set the webbing around the bales and the pulleys properly in the machine.

Figure 1:
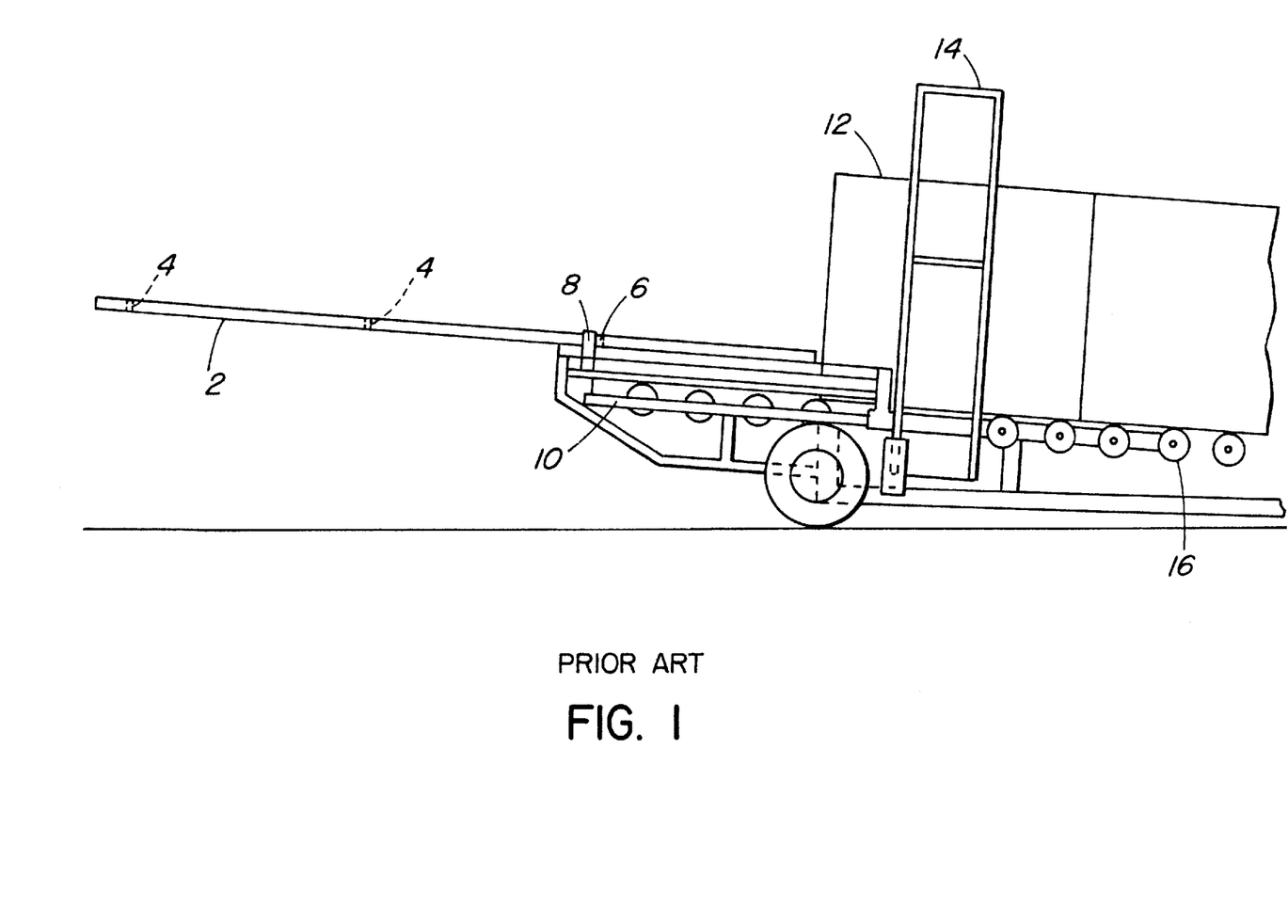
FIG. 1 is a side view of a bale wrapping machine and an elongated pushing bar used in the prior art.

Also, proposed is use of an elongated pushing bar to push the bales through the machine, as shown in FIG. 1. The elongated pushing bar 2 has multiple pin receiving holes 4 along its length. Through one of the holes 4, a removable pin 6 is inserted to connect the pushing bar 2 to the ram cross bar a so as to be driven by the hydraulic rams 10. As the bales are pushed down, the pushing bar 2 is further pushed into the machine so that the bales 12 are pushed through the bale wrapping device 14 and down the inclined support 16. In this method, the pushing bar 2 needs to be long enough to push through the bales almost the entire length of the wrapping machine. Further, the pushing bar 2 needs to be set in a proper position without any support. It is difficult and dangerous to move around and set properly in the machine such a long bar.

Another proposed method is to provide a belt conveyer to carry the bales, as shown in U.S. Pat. No. 5,012,631 issued on May 7, 1991 to Hostetler et al. Such a belt conveyer requires sophisticated mechanisms. Further, loose grass or hay which fallen from bales may clog the belt conveyer.

It is therefore desirable to provide a reliable bale push-off device which is simple and safe to handle.

SUMMARY OF THE INVENTION

An object of the present invention is to provide a bale push-off device which is simple and safe to handle.

To this end, the present invention uses a bale push-off member located on a bale discharging side of a bale wrapping device of a bale wrapping machine. In order to drive the bale push-off member using a bale mover provided on the machine for moving bales from a bale receiving support towards the bale wrapping device, the bale push-off member is connected to the bale mover by a link which is located outside the bale wrapping device.

In accordance with an aspect of the present invention, there is provided a bale push-off device for pushing bales off from a bale wrapping machine for wrapping bales end to end in a row. The bale wrapping machine has a machine mover, a bale receiving support, a bale wrapping device adjacent the bale receiving support, an inclined support adjacent the bale wrapping device, and a bale mover. The machine mover enables the machine to move along a ground surface during the wrapping of bales. The bale receiving support receives bales. The bale wrapping device carries plastic strip around a bale, and has a bale receiving side adjacent the bale receiving support and a bale discharging side adjacent the inclined support. The inclined support transports wrapped bales to a ground surface. The bale mover moves bales from the bale receiving support towards the bale wrapping device. The bale push-off device comprises a bale push-off member and a link. In use, the bale push-off member is located on the bale discharging side of the bale wrapping device to push wrapped bales down the inclined support. The link is located outside the bale wrapping device to connect the bale push-off member to the bale mover so as to drive the bale push-off member by the bale mover.

Other advantages, objects and features of the present invention will be readily apparent to those skilled in the art from a review of the following detailed description of preferred embodiments in conjunction with the accompanying drawings and claims.

BRIEF DESCRIPTION OF THE DRAWINGS

The invention will be further understood from the following description with reference to the drawings in which.

DETAILED DESCRIPTION OF THE PREFERRED EMBODIMENTS

Figure 2:
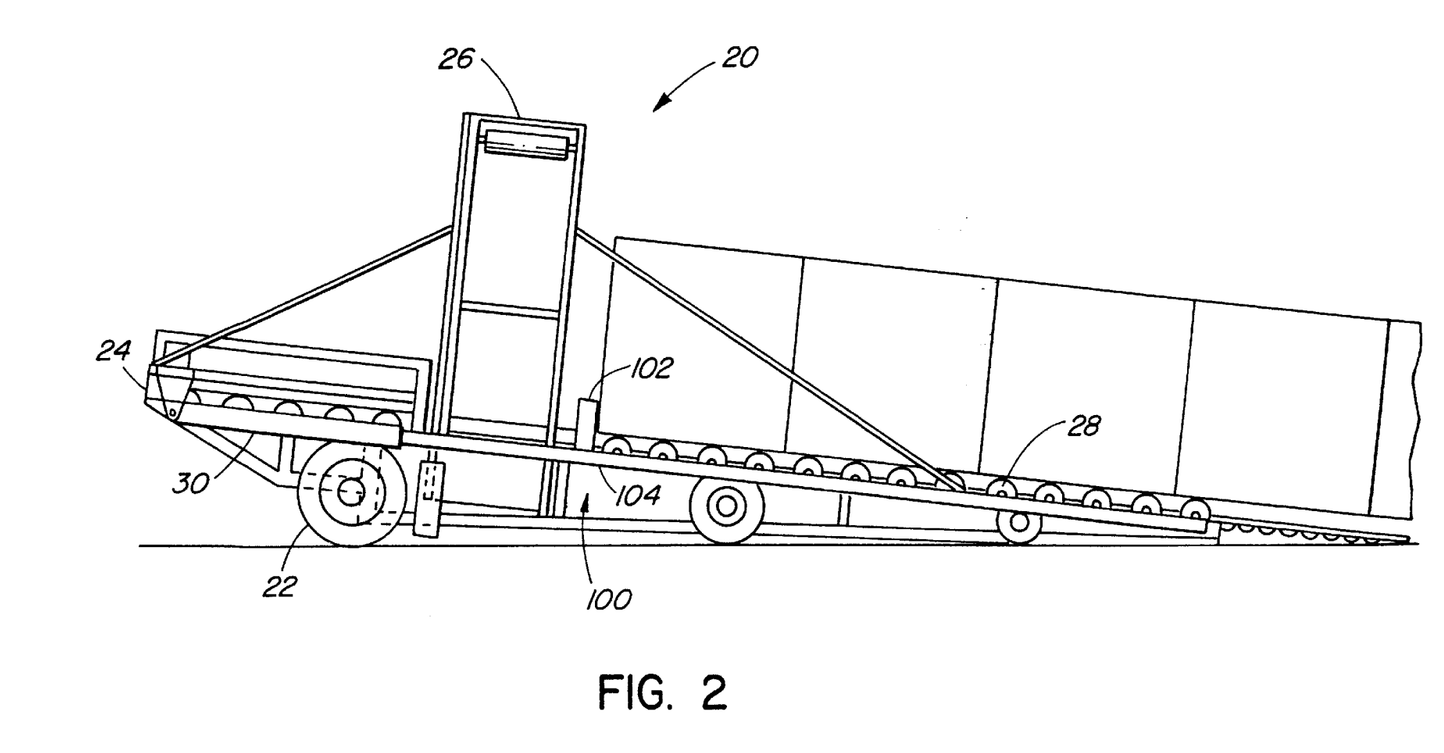
FIG. 2 is a side view of an embodiment of a bale push-off device in accordance with the present invention together with a bale wrapping machine.

Referring to FIG. 2, an embodiment of a bale push-off device in accordance with the present invention is described.

In FIG. 2, the bale push-off device 100 is mounted on a bale wrapping machine 20 having a frame 21. The bale wrapping machine 20 has a machine mover 22 which enables the machine 20 to move along a ground surface during the wrapping operation of bales. The bale wrapping machine 20 also has a bale receiving support 24, a bale wrapping device 26, an inclined support 28 and a bale mover 30. Bales are received by the bale receiving support 24 and translated into the bale wrapping device 28 along the bale receiving support 24 by the bale mover 30. The bale wrapping device 26 carries plastic strip 31 around the bale, and has a bale receiving side 26a adjacent the bale receiving support 24 and a bale discharging side 26b adjacent the inclined support 28. Bales wrapped by the bale wrapping device 26 are pushed down the inclined support 28 to a ground surface by the following bales. Thus, bales are wrapped end to end in a row, resulting in a row of wrapped bales lying on the ground along the track of the machine 20 due to the movement of the machine 20 enabled by the machine mover 22.

The bale wrapping machine 20 shown in FIG. 2 has, as the machine mover 22, three wheels in each side. The machine mover 22 may be also skis, sleds or any one or more mechanisms which allow movement of the machine 20 along the ground surface during the bale wrapping operation.

The bale receiving support 24 and the inclined support 28 may have rollers to facilitate the movement of bales along each support, as shown in FIG. 2. The tail end 29 of the inclined support 28 may be folded up or folded over the rest of the inclined support 28 when the machine 20 is not in use or carried to other locations.

In the bale wrapping device 26 shown in FIG. 2, a rotating hoop 27a carries plastic strip 31 around a bale. The rotating hoop 27a is rotatably supported by a fixed hoop 27b provided on the frame 21 of the machine 20. The rotating hoop 27a and the fixed hoop 27b may have different shapes, and may be located in different arrangements. Also, the rotating hoop 27a may be supported by one ore more fixed supports provided on the frame 21.

During the wrapping process, bales are moved through the rotating hoop 27a by the bale mover 30. The bale wrapping device 26 is located at a gap 25 between the bale receiving support 24 and the inclined support 28. Bales may be supported over the gap 25 by the pressure between the preceding bales and the bale mover 30. There may be one or more additional supports provided in the gap 25 between the bale receiving support 24 and the inclined support 28. The rotating hoop 27a is rotated about its axis by a rotating driver (not shown). It is preferable to synchronize the rotation of the hoop and the movement of the bale mover 30 in such a way that the rotating hoop 27a is rotated as a bale is moved through the rotating hoop 27a. Rotation of the rotation hoop 27a is stopped when the bale is completely or partially wrapped. The rotational speed of the hoop may be varied to adjust the amount of overlap of plastic strip 31 on wrapped bales.

Any form of plastic strip may be used as long as it is suitable for wrapping bales. A reel of plastic strip may be conveniently used. It is preferable to use a stretchable plastic strip and to provide a tension to the strip by tension rolls during the wrapping operation, so that bales are tightly wrapped.

The bale mover 30 may use any moving mechanism and power source as long as it can move bales along the receiving support 24 to the bale wrapping device 26. A hydraulic ram may be conveniently used as described later with reference to FIG. 3.

When a row of bales is wrapped, the last wrapped bale remains in the bale wrapping device 26, and more wrapped bales remain on the inclined support 28. The bale push-off device 100 of the present invention pushes the remaining bales down the inclined support 28.

The bale push-off device 100 comprises a bale push-off member 102 and a link 104. In use, as shown in FIG. 2, the bale push-off member 102 is located to face the bale discharging side 26b of the bale wrapping device 26 to push the remaining bales down the inclined support 28. Thus, the bale push-off member 102 does not go through the bale wrapping device 26.

The link 104 connects the bale push-off member 102 to the bale mover 30 so that the bale push-off member is driven by the bale mover 30.

The link 104 is located outside the bale wrapping device 26, and accordingly, the link 104 does not interfere with the wrapping operation of bales by the wrapping device 26. Therefore, the link 104 does not have to be removed from the bale wrapping machine 20 even when it is not in use. Thus, a long link may be safely used by setting in the machine.

When the bale wrapping machine 20 is in use for the bale wrapping operation, it is desirable to remove the bale push-off member 102 from the path of bales. However, the bale push-off member 102 does not require a long length similar to that of the entire machine 20, as it was necessary in the prior art as shown in FIG. 1. A length similar to the width of the machine 20 or shorter is sufficient for the bale push-off member 102 as long as it can push the bales down the inclined support 28. Therefore, the operation of the bale push-off device 100 is easier and safer compared to the long pushing bar used in the prior art.

Figure 3:
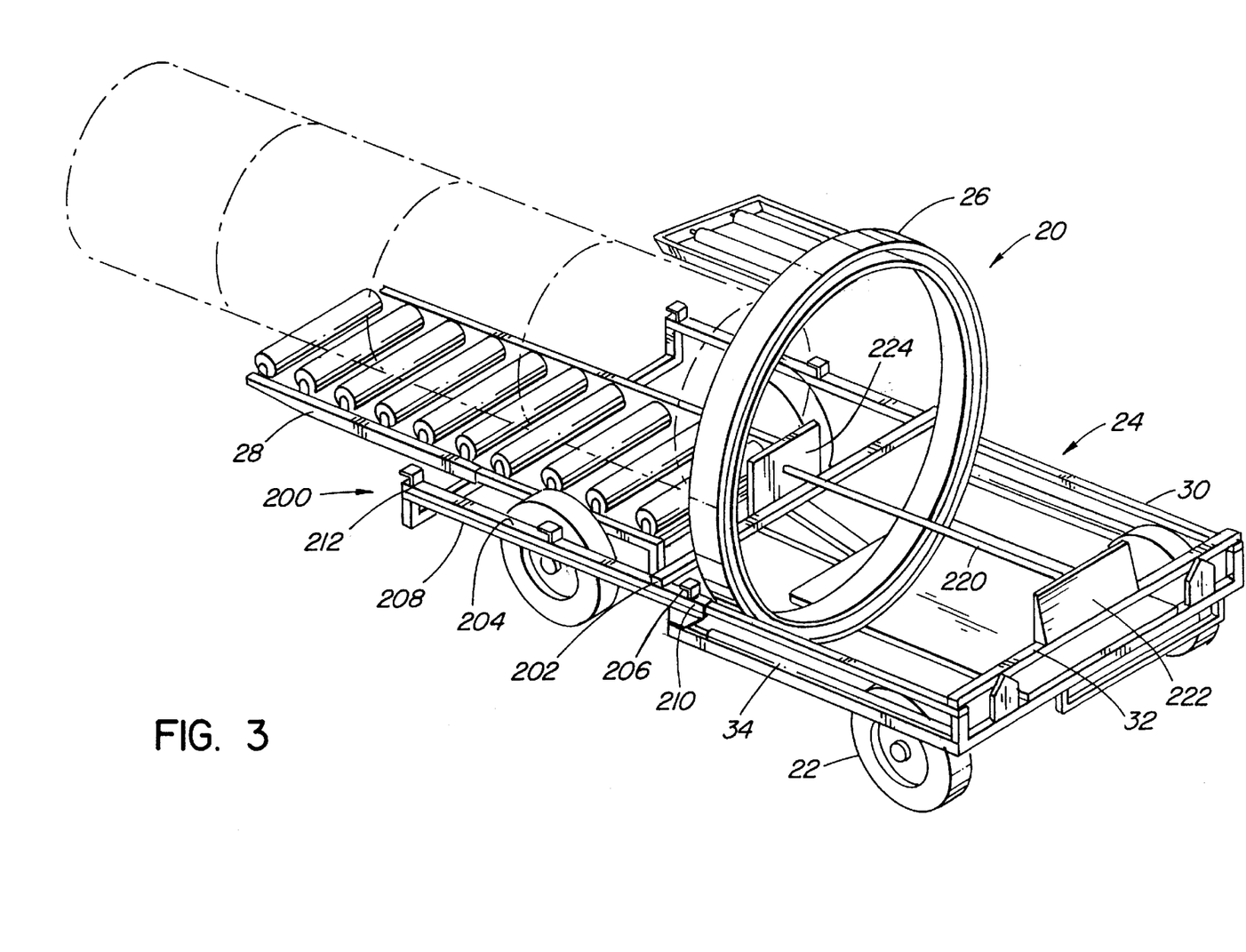
FIG. 3 is a perspective view of another embodiment of a bale push-off device in accordance with the present invention together with a bale wrapping machine.

Referring to FIG. 3, another embodiment of a bale push-off device 200 will be described in connection with more details of the bale mover 30 of the bale wrapping machine 20.

Figure 7:
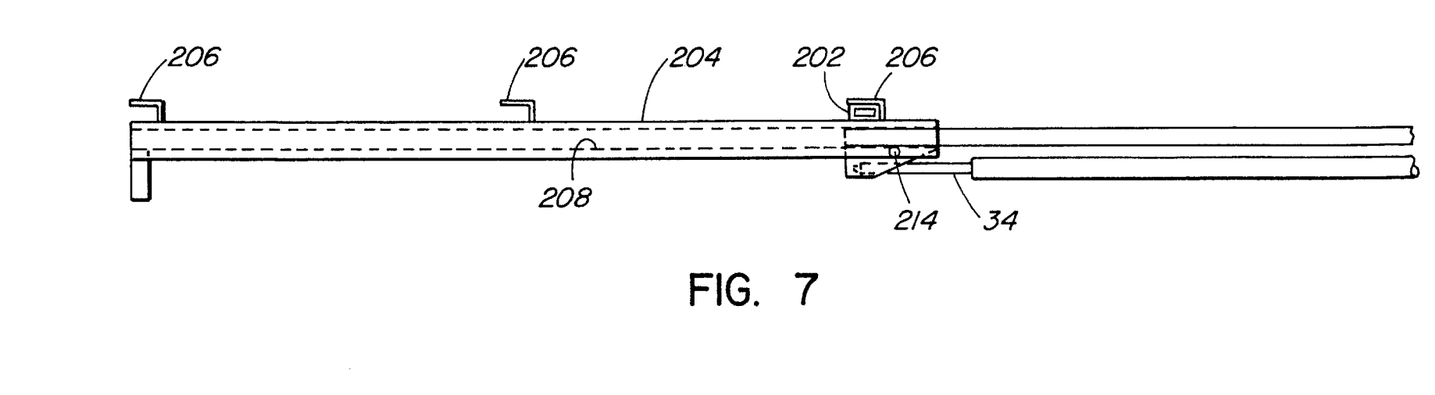
FIG. 7 is a side view of the link of the bale push-off device shown in FIG. 3 when the ram is retracted.
Figure 8:
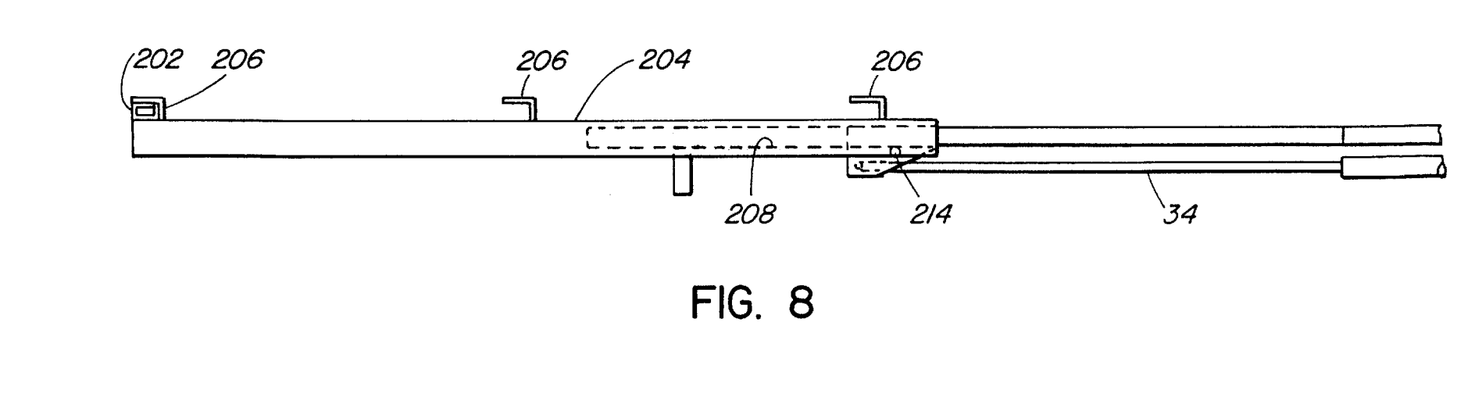
FIG. 8 is a side view of the link of the bale push-off device shown in FIG. 3 when the ram is extended.

In this embodiment, the bale mover 30 comprises a ram cross member 32 and a pair of hydraulic rams or ram cylinders 34 extending along the sides of the bale receiving support 24. The ram cross member 32 is supported across the pair of rams 34 on the bale receiving side 26a of the bale wrapping device 26, and moved by the rams 34 between a bale receiving position 32a for receiving a bale and a bale pushing position 32b for pushing the bale towards the bale wrapping device 26. In this embodiment, the rams 34 are provided in such a way that the ram cross member 32 is positioned at the bale receiving position 32a when the rams are retracted as shown in FIG. 7, and the ram cross member 32 is positioned at the bale pushing position 32b when the rams are extended as shown in FIG. 8.

The bale push-off device 200 comprises an elongated bale push-off member 202 and a pair of links 204. In use, the pair of links 204 are connected to the pair of rams 34 of the bale mover 30. The bale push-off member 202 is placed across the links 204 to face the bale discharging side 26b of the bale wrapping device 26 so as to be moved by the rams 34 of the bale mover 30. Thus, the bale push-off member 202 is easily and reliably supported.

The bale push-off member 202 may be a plate, a rod, a tube, or the like.

Each link 204 may also be a plate, a rod, a tube, or the like.

The rams 34 are generally designed to move a relatively short distance between the bale receiving position and the bale pushing position of the ram cross member 32. Accordingly, the push-off member 202 is moved only the short distance at one movement of the rams 34. In an embodiment in which the inclined support is longer than the bale receiving support, it is preferable to provide a multiple supporting points 205 of the bale push-off member 202 along lengths of the links 204 in order to push the bales further down the inclined support 28.

Figure 5:
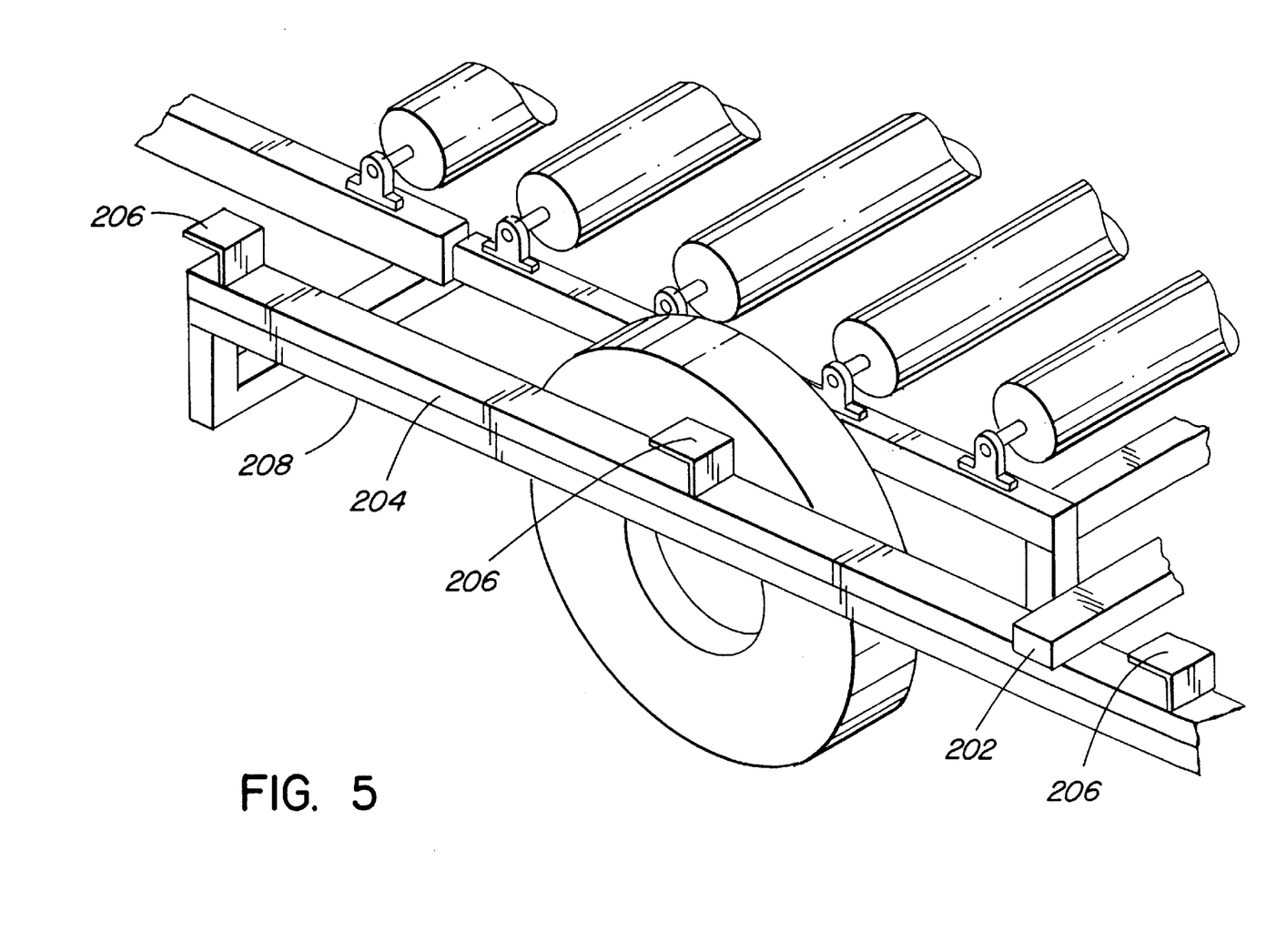
FIG. 5 is a partial perspective view of the bale push-off device shown in FIG. 3.

The multiple supporting points 205 may be provided using hooks 206 as shown in FIG. 5. The hooks 206 are preferably provided at an interval corresponding to the distance between the bale receiving position and the bale pushing position of the ram cross member 32, so as to efficiently use the movement of the rams 34.

It is preferable to provide a link support 208 for slidably supporting each link along the side of the inclined support 28, Provision of the link support 208 is possible because each link 204 is located outside the bale wrapping device 26. Accordingly, the link support 208 is also located outside the bale wrapping device 26 without interfering with the operation of the bale wrapping device 26.

Figure 6:
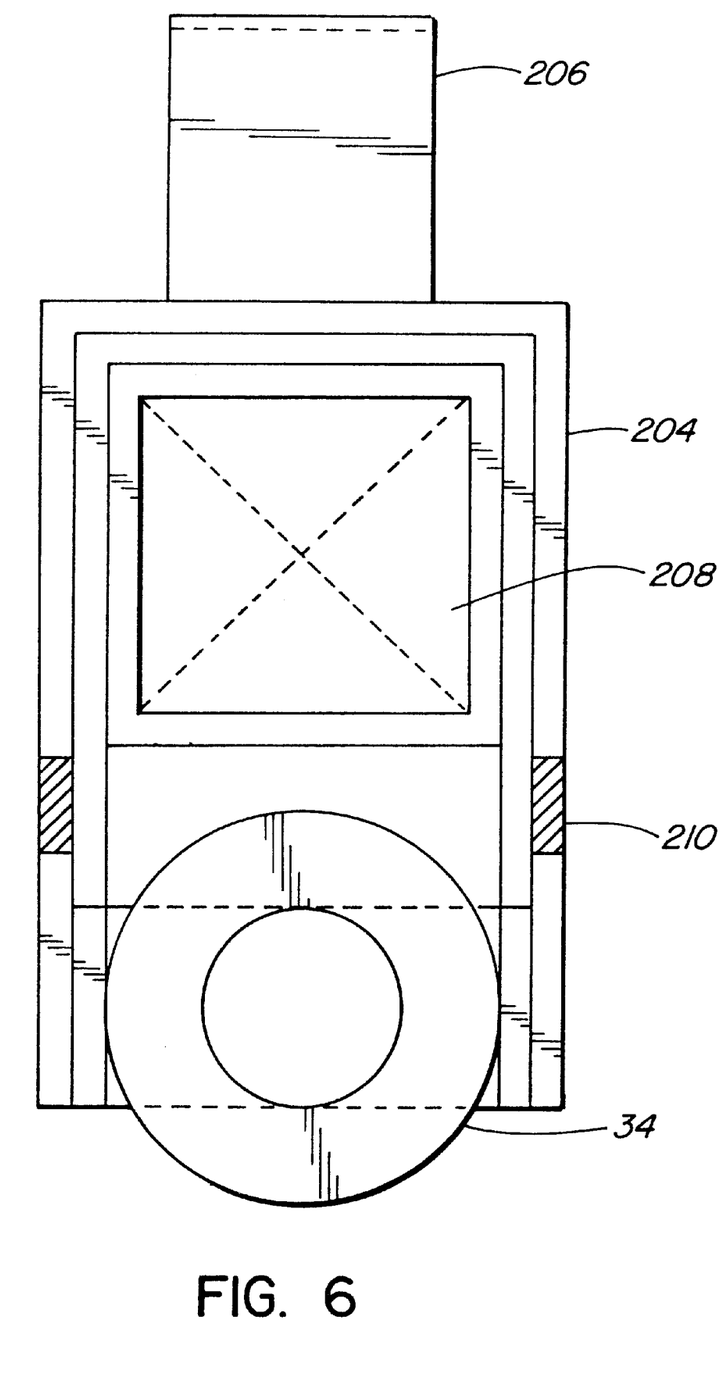
FIG. 6 is an end view of a link of the bale push-off device shown in FIG. 3.

As shown in FIG. 6, each link 204 may have a channel 204a along its length. The link support 208 and an end of the ram 34 are inserted in the channel 204a. Each link 204 may be connected to the respective ram 34 by a connecting pin 214 which is inserted in a pin receiving hole 210 provided in the link 204.

When the bale push-off device is not in use, it is preferable that links 204 are disconnected from the rams 34 to release unnecessary loads from the rams 34. The disconnected links 204 may be connected to the frame 21 of the machine 20, such as the inclined support 28 or the link support 208. Such connection of the links 204 may be easily done by relocating the connecting pins 214 into another pin receiving hole 212 provided in the link 204 and a corresponding hole provided on the link support.

Referring back to FIG. 3, in order to push through the bale remained in the bale wrapping device 26, it is preferable to use a push-through member 220 whose length is just enough to push the bale through the bale wrapping device 26 using the bale mover 30. In use, one end of the push-through member 220 is connected to the ram cross member 32 of the bale mover 30. In order to facilitate the connection, a ram plate 222 may be attached to the ram cross member 32. Also, a push-through plate 224 may be attached to the other end of the push-through member 220 for pushing the bale.

The operation of the push-off device is described referring to FIG. 3. When a row of bales is wrapped, the bale wrapping device 26 is turned off, i.e. plastic strip 31 ceases to be carried around the bales. At this point, the rams 34 are retracted so that the ram cross member 32 is positioned at the bale receiving position.

The push-through member 220 is inserted onto the ram plate 222 attached to the ram cross member 32 of the bale mover 30. Then, the rams 34 are extended to push the bale through the bale wrapping device 26.

The rams 34 are then retracted all the way, and the connecting pins connecting the links 204 to the link supports 208 are pulled out and relocated to pin receiving holes 210 of the links 204 so that the links 204 are connected to the rams 34.

The push-off member 202 is placed across the links 204 between the bale wrapping device 26 and the last bale, and held by the respective hooks 206 provided on the links 204. By extending the rams 34, the bales are pushed down the inclined support 28 by the push-off member 202.

Figure 4:
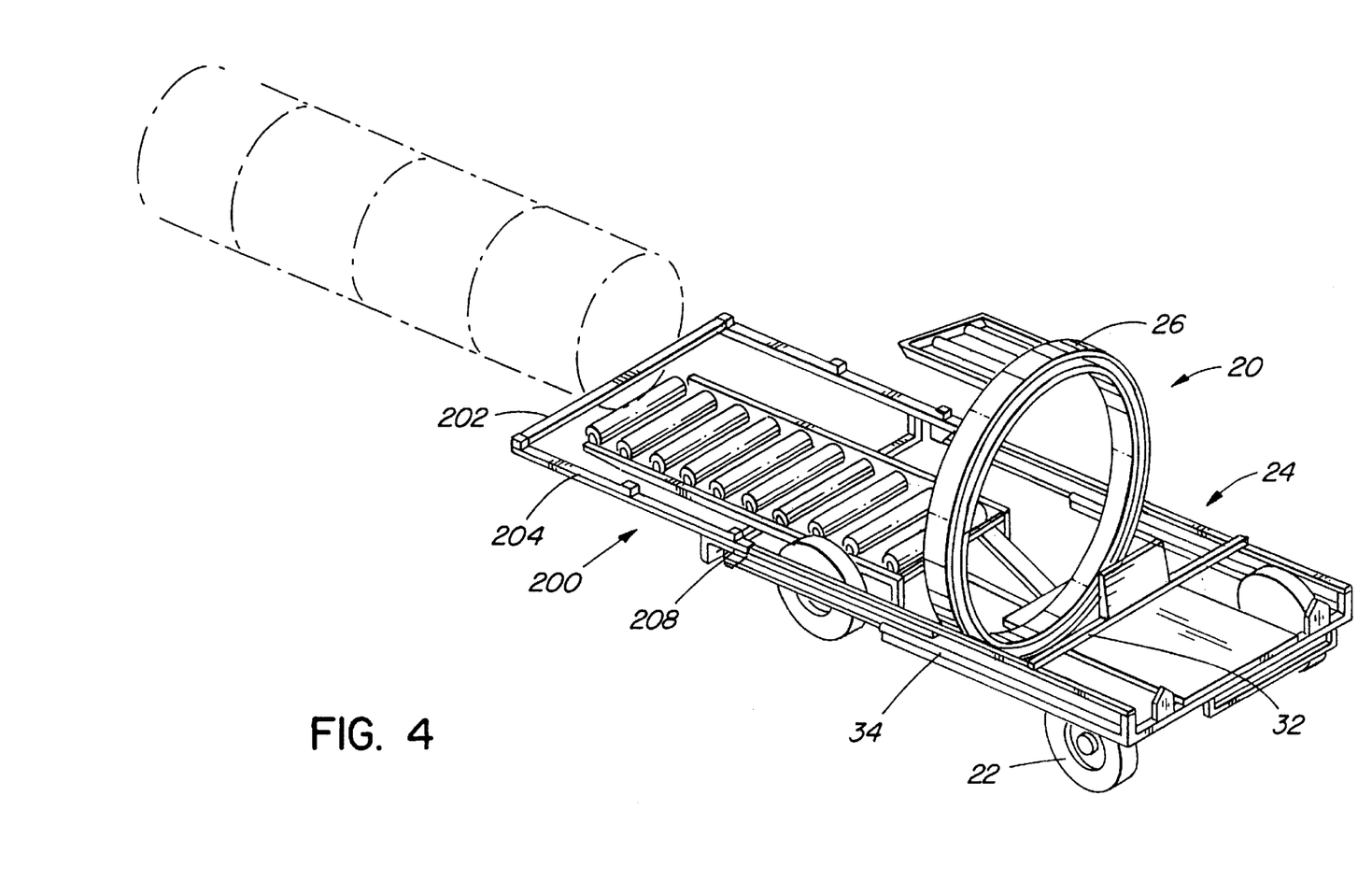
FIG. 4 is a perspective view showing the operation of the bale push-off device shown in FIG. 3.

After the rams 34 are extended all the way, they are retracted, the push-off member 202 is relocated to the next hooks, and the pushing is resumed by extending the rams 34. These steps are repeated until the last hooks are used, as shown in FIG. 4.

In the above embodiments, the bale push-off devices have been described as a separate device from the bale wrapping machine. However, a bale wrapping machine may be equipped with such a bale push-off device as a part of the machine. A bale wrapping machine may be also equipped with a bale push-through member.

While particular embodiments of the present invention have been shown and described, changes and modifications may be made to such embodiments without departing from the true scope of the invention. For example, the rams may be provided in the other direction, or a single ram or more than two rams may be used. The number of hoops used and the design of the bale wrapping device may be also modified.

What is claimed is:

1. A bale push-off device for pushing bales off from a bale wrapping machine for wrapping bales end to end in a row, the bale wrapping machine having:
   a machine mover for enabling the machine to move along a ground surface during the wrapping of bales;
   a bale receiving support for receiving bales;
   a bale wrapping device adjacent the bale receiving support for carrying plastic strip around a bale, the bale wrapping device having a bale receiving side adjacent the bale receiving support and a bale discharging side;
   an inclined support adjacent the bale discharging side of the bale wrapping device for transporting wrapped bales to a ground surface; and
   a bale mover for moving bales from the bale receiving support towards the bale wrapping device;
   the bale push-off device comprising:
      a bale push-off member useable on the bale discharging side of the bale wrapping device to push wrapped bales down the inclined support; and
      a link for being located outside the bale wrapping device and extending along a side of the inclined support to connect the bale push-off member to the bale mover so as to drive the bale push-off member by the bale mover.

2. A bale push-off device as claimed in claim 1, wherein the link is capable of removably supporting the push-off member at multiple supporting points along the length of the link.

3. A bale push-off device as claimed in claim 1 further comprising a link support for slidably supporting the link along the inclined support.

4. A bale push-off device as claimed in claim 3 wherein the link is connectable to the link support when the link is not connecting the bale push-off member to the bale mover.

5. A bale push-off device for pushing bales off from a bale wrapping machine for wrapping bales end to end in a row, the bale wrapping machine having:
   a machine mover for enabling the machine to move along a ground surface during the wrapping of bales;
   a bale receiving support for receiving bales;
   a bale wrapping device adjacent the bale receiving support for carrying plastic strip around a bale, the bale wrapping device having a bale receiving side adjacent the bale receiving support and a bale discharging side;
   an inclined support adjacent the bale discharging side of the bale wrapping device for transporting wrapped bales to a ground surface; and a bale mover for moving bales from the bale receiving support towards the bale wrapping device, the bale mover comprising:
   a ram cross member located on the bale receiving side of the bale wrapping device for pushing bales;
   a pair of rams extending along sides of the bale receiving support for supporting the ram cross member across the pair of rams so as to move the ram cross member between a bale receiving position and a bale pushing position;
the bale push-off device comprising:
   an elongated bale push-off member useable on the bale discharging side of the bale wrapping device to push wrapped bales down the inclined support; and
   a pair of links for being located outside the bale wrapping device to connect the elongated bale push-off member to the pair of rams of the bale mover by supporting the elongated bale push-off member across the pair of links so as to drive the elongated bale push-off member by the pair of rams of the bale mover.

6. A bale push-off device as claimed in claim 5, wherein the pair of links is capable of removably supporting the push-off member at multiple supporting points along lengths of the links.

7. A bale push-off device as claimed in claim 6 wherein the multiple supporting points are located at an interval corresponding to a distance between the bale receiving position and the bale pushing position of the ram cross member of the bale mover.

8. A bale push-off device as claimed in claim 5 further comprising a pair of link supports for slidably supporting the pair of links along sides of the inclined support.

9. A bale push-off device as claimed in claim 8 wherein the pair of links is connectable to the link support when they are not connecting the elongated bale push-off member to the pair of rams.

10. A bale wrapping machine for wrapping bales end to end in a row, the bale wrapping machine comprising:
   a machine mover for enabling the machine to move along a ground surface during the wrapping of bales;
   a bale receiving support for receiving bales;
   a bale wrapping device adjacent the bale receiving support for carrying plastic strip around a bale, the bale wrapping device having a bale receiving side adjacent the bale receiving support and a bale discharging side;
   an inclined support adjacent the bale discharging side of the bale wrapping device for transporting wrapped bales to a ground surface;
   a bale mover for moving bales from the bale receiving support towards the bale wrapping device;
   a bale push-off member useable on the bale discharging side of the bale wrapping device to push wrapped bales down the inclined support; and
   a link located outside the bale wrapping device and extending along a side of the inclined support to connect the bale push-off member to the bale mover so as to drive the bale push-off member by the bale mover.

11. A bale wrapping machine as claimed in claim 10, wherein the link is capable of removably supporting the push-off member at multiple supporting points along the length of the link.

12. A bale wrapping machine as claimed in claim 10 further comprising a link support for slidably supporting the link along the inclined support.

13. A bale wrapping machine as claimed in claim 12 wherein the link is connectable to the link support when the link is not connecting the bale push-off member to the bale mover.

14. A bale wrapping machine as claimed in claim 10 further comprising an elongated push-through member for pushing bales through the bale wrapping device, the elongated push-through member having a first end and a second end, the first end being engageable with a bale located in the bale wrapping device, and the second end being connectable to the ram cross member of the bale mover so as to drive the elongated push-through member by the bale mover.

15. A bale wrapping machine for wrapping bales end to end in a row, the bale wrapping machine comprising:
   a machine mover for enabling the machine to move along a ground surface during the wrapping of bales;
   a bale receiving support for receiving bales;
   a bale wrapping device adjacent the bale receiving support for carrying plastic strip around a bale, the bale wrapping device having a bale receiving side adjacent the bale receiving support and a bale discharging side;
   an inclined support adjacent the bale discharging side of the bale wrapping device for transporting wrapped bales to a ground surface;
   a bale mover for moving bales from the bale receiving support towards the bale wrapping device,
   a bale mover for moving bales from the bale receiving support towards the bale wrapping device, the bale mover comprising:
      a ram cross member located on the bale receiving side of the bale wrapping device for pushing bales;
      a pair of rams extending along sides of the bale receiving support for supporting the ram cross member across the pair of rams so as to move the ram cross member between a bale receiving position and a bale pushing position;
   an elongated bale push-off member useable for the bale discharging side of the bale wrapping device to push wrapped bales down the inclined support; and
   a pair of links located outside the bale wrapping device to connect the elongated bale push-off member to the pair of rams of the bale mover by supporting the elongated bale push-off member across the pair of links so as to drive the elongated bale push-off member by the pair of rams of the bale mover.

16. A bale wrapping machine as claimed in claim 15, wherein the pair of links is capable of removably supporting the push-off member at multiple supporting points along lengths of the links.

17. A bale wrapping machine as claimed in claim 16 wherein the multiple supporting points are located at an interval corresponding to a distance between the bale receiving position and the bale pushing position of the ram cross member of the bale mover.

18. A bale wrapping machine as claimed in claim 15 further comprising a pair of link supports for slidably supporting the pair of links along sides of the inclined support.

19. A bale wrapping machine as claimed in claim 18 wherein the pair of links is connectable to the link support when they are not connecting the elongated bale push-off member to the pair of rams.

20. A bale wrapping machine as claimed in claim 15 further comprising an elongated push-through member for pushing the bale through the bale wrapping device; the elongated push-through member having a first end and a second end, the first end being engageable with a bale located in the bale wrapping device, and the second end being connectable to the ram cross member of the bale mover so as to drive the elongated push-through member by the bale mover.

* * * * *

UNITED STATES PATENT AND TRADEMARK OFFICE
CERTIFICATE OF CORRECTION

PATENT NO. : 6,089,003
DATED : July 18, 2000
INVENTOR(S) : Oscar Frey

It is certified that error appears in the above-indentified patent and that said Letters Patent is hereby corrected as shown below:

On the Title Page after section [22] add a new section as follows:

--[30] Foreign Application Priority Data
Sept. 18, 1997 [CA] Canada ......... 2,215,776--

Col. 1, line 43 delete "a so" and insert therefor --8 so--.

Claim 15, column 8, line 32 delete "for" and insert therefor --on--.

Signed and Sealed this

Seventeenth Day of April, 2001

Attest:

NICHOLAS P. GODICI

Attesting Officer

Acting Director of the United States Patent and Trademark Office